United States Patent [19]

Eisele et al.

[11] 4,435,745
[45] Mar. 6, 1984

[54] DEVICE FOR GENERATING SPECIFIC ELECTRICAL VOLTAGE VALUES FOR CONSUMERS ASSOCIATED WITH AN INTERNAL COMBUSTION ENGINE

[75] Inventors: Hermann Eisele, Vaihingen; Martin Hill, Stuttgart; Hartmut Schweizer, Korntal, all of Fed. Rep. of Germany

[73] Assignee: Robert Bosch GmbH, Stuttgart, Fed. Rep. of Germany

[21] Appl. No.: 359,637

[22] Filed: Mar. 18, 1982

[30] Foreign Application Priority Data

Mar. 19, 1981 [DE] Fed. Rep. of Germany ....... 3110685

[51] Int. Cl.³ .......................................... H02M 3/335
[52] U.S. Cl. ..................................... 363/21; 323/223; 363/101
[58] Field of Search ................... 307/10 R, 10 BP, 24, 307/31, 34; 323/223, 282, 303; 363/20, 21, 59, 60, 61, 101

[56] References Cited

U.S. PATENT DOCUMENTS

| | | | |
|---|---|---|---|
| 4,155,112 | 5/1979 | Miller et al. | 363/21 |
| 4,187,536 | 2/1980 | Govaert et al. | 363/97 X |
| 4,322,787 | 3/1982 | Kraus | 363/21 |
| 4,355,277 | 10/1982 | Davis et al. | 363/21 X |

*Primary Examiner*—William M. Shoop
*Attorney, Agent, or Firm*—Edwin E. Greigg

[57] ABSTRACT

A device is proposed for generating specific electrical voltage values for consumers associated with an internal combustion engine. The device also encompasses a voltage elevating circuit which can be switched on in the vicinity of the minimum voltages for the consumers. This means that this voltage elevating circuit does not need to be switched on continuously during engine operation, but rather only at times of increased power needs. The voltage elevating circuit has a series circuit of a coil 20 and a diode 21 in a voltage supply line, and the connecting point of these two components is briefly closed off from the other supply line in a clocked manner. The activation of the voltage elevating circuit can be switched on and off in accordance with the input and output voltages and in accordance with the maximum permissible switching current. Depending on the clock frequency of the switch 23, the line inductance of the supply line suffices as an inductance 20.

5 Claims, 6 Drawing Figures

DEVICE FOR GENERATING SPECIFIC ELECTRICAL VOLTAGE VALUES FOR CONSUMERS ASSOCIATED WITH AN INTERNAL COMBUSTION ENGINE

BACKGROUND OF THE INVENTION

In the electronic control of internal combustion engines, particular attention has always been paid to the supply of electical voltage to electrical consumers. This is because as a rule the electrical voltage available for use in a motor vehicle fluctuates widely depending on the operational state; engine starting at cold temperatures is of primary importance here. Particularly as a result of the starting process, the vehicle voltage drops to low values, and vehicle manufacturers accordingly require that the individual systems be designed for these values in the range of up to about 5 or 6 volts, given a normal voltage supply of 12 volts. The result is that in conventional systems, the supply voltage for the individual consumers has to be artificially reduced during operation, which is unfavorable from a standpoint of the conductivity balance. Furthermore, at a low operating voltage, the individual consumers require relatively high electric currents in order to attain a specific output; this, in turn, requires large conductivity cross sections. Final control elements for electronic regulation of Diesel injection are an example of this.

OBJECT AND SUMMARY OF THE INVENTION

The present invention relates to a device for generating specific electrical voltages for electrical consumers with a voltage booster. The voltage booster or elevating circuit is switched on upon detection of a minimum source voltage. With the present invention, the difference between normal operational voltage and the minimum operating voltage of the consumer can be kept very small, and because of the higher voltage values which are generated by the voltage elevating circuit the design of the individual consumers is more favorable in terms of cost.

The voltage elevating circuit consists of an inductive device in series with a diode that passes only the positive cycle of the signal through the coil to boost the voltage to the load. A regulator is provided to detect voltage in the circuit and to activate the circuit accordingly. Short circuits across the inductive device and the diode are activated by a relay when source voltage is sufficiently high to reduce overall power consumption.

An object of the present invention is to provide a device which boosts voltage to a desired level when a minimum source voltage is detected.

Another object is to provide a device which protects electrical loads from voltage surges.

A further object is to provide a device which short-circuits selected elements of the device at detection of sufficient source voltage to minimize overall power loss.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
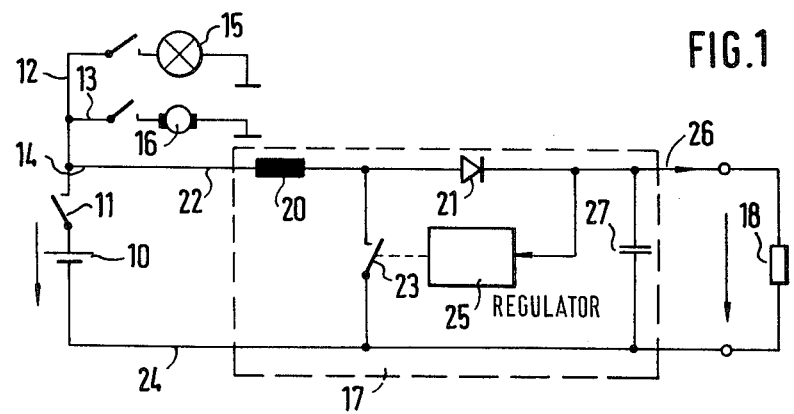
FIG. 1 shows the fundamental disposition of the apparatus for generating specific electrical voltage values for consumers associated with an internal combustion engine.

FIG. 1 is a general overview of the on-board electrical system of a motor vehicle, with the device according to the invention for generating specific voltage values. The vehicle battery is marked by reference numeral 10 and the ignition switch by 11. On the output side of the ignition switch 11, three lines 12, 13 and 14 are shown, which lead indirectly to a single lamp 15 indicated in symbolic form, to a starter 16, and directly to the device 17 for generating specific electric voltage values. At the output of the device 17, finally, there is also a consumer 18, at which a stabilized voltage is available for use. From the fundamental illustration provided by FIG. 1, it can be seen that some of the electrical consumers of a motor vehicle are capable of being coupled with the battery 10, while specialized consumers or loads are supplied with a constant voltage level via the device 17.

The device 17 for generating a specific voltage value includes a voltage elevating circuit comprising a coil 20 and a diode 21 in the positive lead 22 and a switch 23 from the connecting point of coil 20 and diode 21 to a negative line 24. The switch 23 is triggered by output signals of a regulator 25 (discussed in more detail with respect to FIG. 5), which in turn receives an input signal from the output terminal 26 of the device 17. Finally, a capacitor 27 serving as an energy-storing means is also connected from this output terminal 26 to ground.

It has proved advantageous for the response threshold of the regulator 25 to be disposed more or less close to but below the normal battery voltage, so that the voltage elevating circuit having the elements 20, 21 and 23 comes into action only at the relatively infrequent times where there is an increased power requirement on the part of the internal combustion engine; an example of this is engine starting.

In the subject of FIG. 1, if the voltage over the capacitor 27 falls below a specific value, then the regulator 25 switches on and clocks the switch 23. This, in turn, causes self-induction peaks in the coil 20, the positive components of which reach the storage capacitor 27 via the diode 21. Depending on the frequency with which the switch 23 is actuated, the voltage potential at the output 26 of the device 17 can by "pumped up" in this manner. The magnitude of this "pumping" is finally dependent on the difference between the desired output voltage and the battery voltage available for use. In every case, it is thereby assured that voltage does not drop below a specific voltage value at the consumer 18 even at low battery voltage values.

Important aspects of the subject shown in principle in FIG. 1, that is, of the device for generating specific electrical voltage values, are the selection of the switch-on and switch-off points for the regulator 25.

Figure 2:
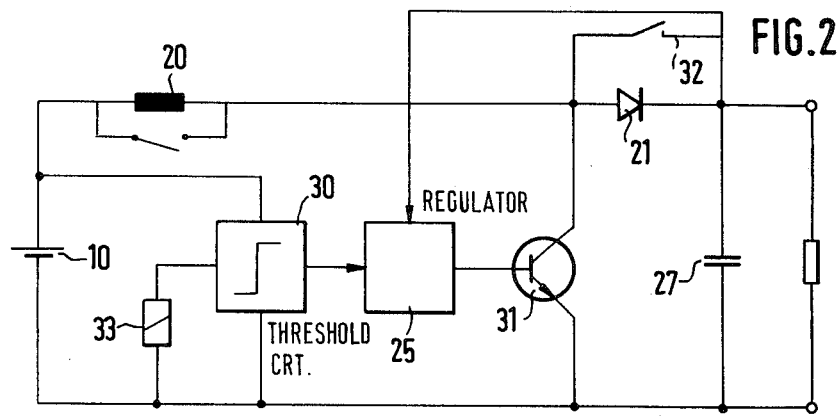
FIGS. 2-4 show alternative means of attaining the signal pickup.
Figure 3:
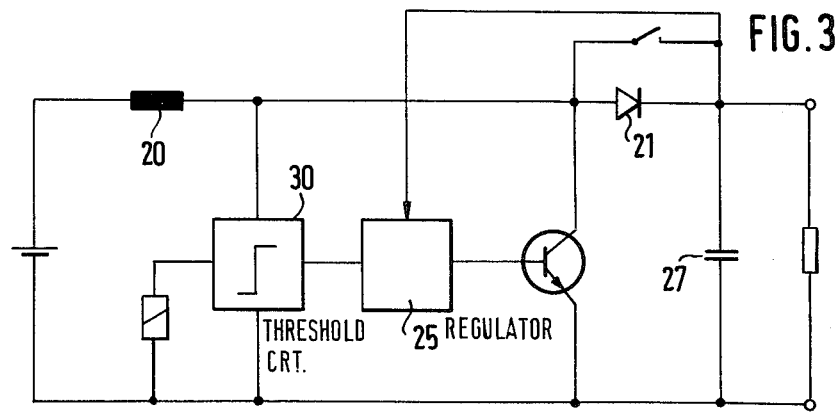
Figure 4:
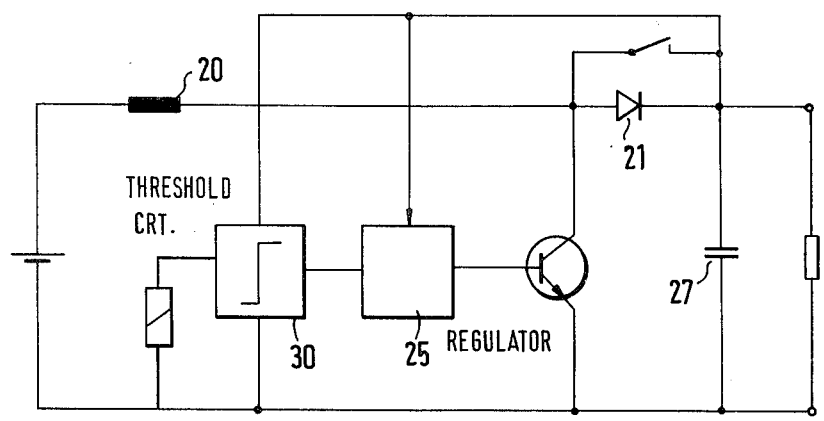

FIGS. 2, 3 and 4 show various possibilities for pickup points for the signal switching the regulator 25 on and off. These again are shown only in principle; their practical realization, however, presents no difficulties for one skilled in the art. In the subject of FIG. 2, a threshold switch 30 is provided for interrogating the voltage of the battery 10. If this battery voltage falls below a specific value, then the regulator 25 is activated and exposes the transistor 31 (acting as the switch 23) to pulses in such a way and for such a period of time that the desired voltage is again attained over the capacitor 27.

The lines in FIG. 2 parallel to the diode 21 indicate a switch 32, which is actuatable by a relay 33. The purpose of the switch is to short-circuit the diode 21 during normal operation (that is, when the battery voltage is sufficiently high), so as to prevent an unnecessary loss in power. A similar short-circuit 50 can be provided for the coil 20, also controlled by relay 33. The trigger signal for the relay can occur simultaneously with the output signal of the threshold switch 30 for the regulator 25.

FIG. 3 shows the same basic circuit layout as FIG. 2, with the single difference that it is the voltage following the coil 20 which is picked up as the input voltage for the threshold switch 30. In this case, the threshold switch 30 must also include timing elements, which block out the voltage increases during active operation of the voltage elevating circuit initiated at the coil 20. A simple delay-type circuit would suffice.

A further possibility is shown in FIG. 4. There, the input signal for the threshold switch 30 is picked up from the output of the device for generating specific voltage values, and it corresponds to the actual value at a given time.

Figure 5:
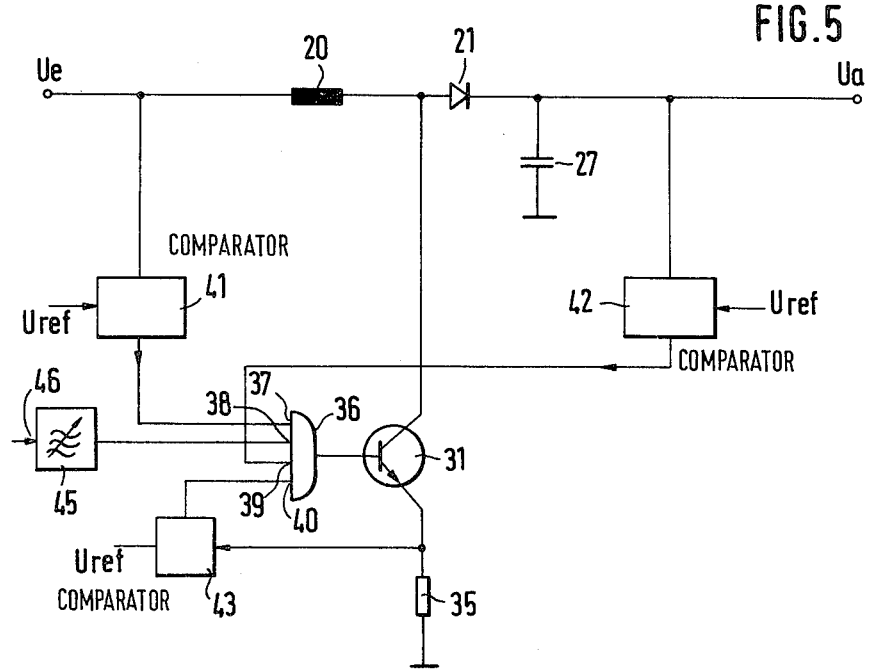
FIG. 5 is a detailed block circuit diagram of a device according to the invention; and finally.

FIG. 5 shows a further fundamental illustration of the device for generating specific voltage values, having the basic elements of coil 20, diode 21, transistor 31 (acting as the switch 23 of FIG. 1) and capacitor 27. In this case, a current-measurement resistor 35 is also disposed in series with the collector-emitter path of the transistor 31. This resistor 35 serves to realize a means of current limitation for the collector current of the transistor 31. The base of this transistor 31 is preceded by an AND gate 36 having four inputs 37-40. The input variables for this AND gate 36 are the output signals of three comparators 41, 42 and 43. For details of the comparators, see FIG. 6. While the comparator 41 detects the input voltage and determines the basic on-off behavior of the device 17, the comparator 42 makes the comparison between set-point and actual output voltage values. The third comparator 43 detects the voltage drop over the resistor 35 in order to realize the limitation of current for the transistor 31. Finally, a signal from an alternating voltage source 45, which is controllable as needed, is applied to the fourth input (38) of the AND gate 36. The frequency of this alternating voltage source 45 may be variable via an input 46; another variable influencing it may also be the output signal of the current limiting device (comparator 43).

The switching thresholds of comparators 41 and 42 in particular should be adapted to the given usage of the device, and they may have a greater or smaller amount of hysteresis.

Figure 6:
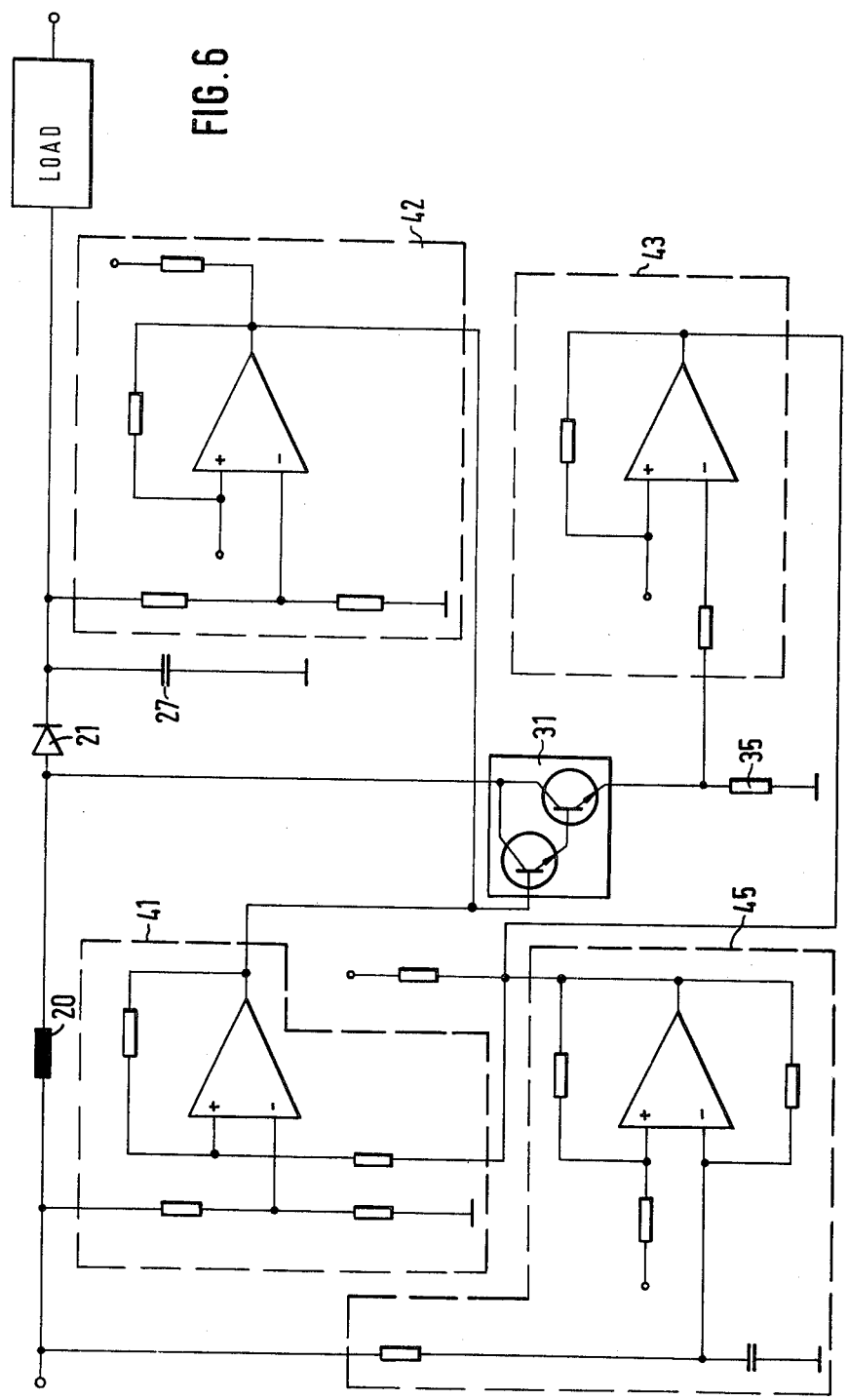
FIG. 6 is a detailed circuit diagram for the subject of FIG. 5.

FIG. 6 shows a detailed example for the subject of FIG. 5; again, identical elements are provided with identical reference numerals.

The individual comparators 41, 42 and 43 in the subject of FIG. 6 are designed in a known form. The alternating voltage source 45 is realized by means of an RC generator of known construction. In contrast to what is shown in FIG. 5, the AND gate 36 does not exist in direct form in FIG. 6. Instead, it is subdivided, and the output signals of the comparator 43 and of the oscillator 45 act upon the threshold value of the comparator 41, while both outputs of the comparators 41 and 42 are carried to a common input terminal of the transistor 31. Details of the current layout detscribed above and shown in detail in the drawing in FIG. 6 have long been familiar to one skilled in the art and accordingly need no further explanation.

In summary, the above-described devices for generating specific voltage values have the following advantages:

The output voltage of the device can be elevated to a desired level. As a result, subsequent consumers are protected from voltage surges.

The consumers can be designed for a higher voltage and lower current.

The required input voltage, below which the regulation is to become effective, can be precisely set.

Independent adjustment of regulating variables is possible, and optimal efficiency of the switching regulator can thus be attained.

Short-term operation is possible with an appropriate layout.

A low power loss on the part of the device is enabled by means of a possible short-circuiting of the diode 21 and/or of the coil 20 during non-active operation.

The peak current through the transistor 31 can be limited to a permissible level.

Depending on the frequency of the oscillator 45, which provides the switching signal for the transistor 31, the coil 20 may be eliminated as a separate component if a correspondingly high frequency is selected, and the line inductance then suffices for the required self-induction.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A device for generating specific electrical voltage values for electrical consumers of an internal combustion engine having means to detect predetermined minimum voltages and having a voltage source and a voltage elevating circuit comprising, an input and output voltage and includes a regulating means which has a threshold value and is connected such that the regulating means closes the switch to activate the voltage elevating circuit when the input voltage is below the threshold value, and such that the output voltage is regulated to a specific set-point value, wherein the regulating means has a current limiting circuit with an output connected to the switch to limit current in the switch and a first comparator connected to receive the current limiting circuit output and connected to activate the switch according to the current limiting circuit output, wherein the switch is connected to and controlled by an AND gate with an input side connected to the voltage source and the first comparator, wherein the voltage elevating circuit also includes: a second comparator connected to receive and compare the input voltage to a reference voltage, and a third comparator connected to receive and compare the output voltage to a reference voltage, and wherein the input side of the AND gate is also connected to the second and third comparators such that the switch is controlled via the AND gate by the voltage source and the first, second and third comparators, and wherein the voltage elevating circuit is connected to the means to detect predetermined minimum voltages to be switched on at a predetermined minimum voltage.

2. A device as defined by claim 1, wherein the inductance means in the supply line is an inductance coil.

3. A device for generating specific electrical voltage values for electrical consumers of an internal combustion engine having a means to detect predetermined minimum voltages and having a voltage source and a voltage elevating circuit comprising, a series circuit of an inductance means and a diode in a voltage supply line connected to the consumer, and a switch having a first end connected to a second supply line and having a second end connected between the inductance means and the diode, wherein the switch is connected to the inductance means to be controlled by an alternating voltage signal, wherein the voltage elevating circuit includes a relay connected to the voltage source and to a first short-circuit which is connected over the diode, such that the relay short circuits the diode when the voltage source output is above a predetermined level, and wherein the voltage elevating circuit is connected to the means to detect predetermined minimum voltages to be switched on at a predetermined minimum voltage.

4. A device for generating specific electrical voltage values for electrical consumers of an internal combustion engine having a means to detect predetermined minimum voltages and having a voltage source and a voltage elevating circuit comprising, a series circuit of an inductance means and a diode in a voltage supply line connected to the consumer, and a switch having a first end connected to a second supply line and having a second end connected between the inductance means and the diode, wherein the switch is connected to the inductance means to be controlled by an alternating voltage signal, wherein the voltage elevating circuit includes a relay connected to the voltage source and to a second short circuit which is connected over the inductance means, such that the relay short circuits the inductance means when voltage source output is above a predetermined level, and wherein the voltage elevating circuit is connected to the means to detect predetermined minimum voltages to be switched on at a predetermined minimum voltage.

5. A device for generating specific electrical voltage values for electrical consumers of an internal combustion engine having a means to detect predetermined minimum voltages and having a voltage source and a voltage elevating circuit comprising, a series circuit of an inductance means and a diode in a voltage supply lines connected to the consumer, and a switch having a first end connected to a second supply line and having a second end connected between the inductance means and the diode, wherein the switch is connected to the inductance means to be controlled by an alternating voltage signal, wherein the voltage elevating circuit includes a relay connected to the voltage source, and to a first short-circuit which is connected over the diode and to a second short circuit which is connected over the inductance means, such that the relay short circuits the diode and the inductance means when the voltage source output is above a predetermined level, and wherein the voltage elevating circuit is connected to the means to detect predetermined minimum voltages to be switched on at a predetermined minimum voltage.

* * * * *